US009848534B1

(12) United States Patent
Cavkusic et al.

(10) Patent No.: US 9,848,534 B1
(45) Date of Patent: Dec. 26, 2017

(54) AGRICULTURAL HARVESTING UNIT AND METHOD OF HARVESTING USING THE UNIT

(71) Applicant: Crary Industries, Inc., West Fargo, ND (US)

(72) Inventors: Damir Cavkusic, Fargo, ND (US); Ben Richard, Fargo, ND (US); Daniel Ross, Moorhead, MN (US); Michael Leach, Fargo, ND (US); Mitchell Lee, Fargo, ND (US)

(73) Assignee: Crary Industries, Inc., West Fargo, ND (US)

( * ) Notice: Subject to any disclaimer, the term of this patent is extended or adjusted under 35 U.S.C. 154(b) by 0 days.

(21) Appl. No.: 15/191,117

(22) Filed: Jun. 23, 2016

(51) Int. Cl.
*A01D 57/00* (2006.01)
*A01D 41/06* (2006.01)
*A01D 41/127* (2006.01)
*A01D 101/00* (2006.01)

(52) U.S. Cl.
CPC ............ *A01D 57/00* (2013.01); *A01D 41/06* (2013.01); *A01D 41/1274* (2013.01); *A01D 2101/00* (2013.01)

(58) Field of Classification Search
CPC .. A01D 45/007; A01D 46/005; A01D 46/285; A01D 57/00; A01D 57/02; A01D 57/10; A01D 41/06; A01D 41/1274; A01D 2101/00; A01F 12/10; Y10S 56/08
USPC ............ 56/10.1, 10.2 A–10.2 F, 10.2 R, 153, 56/12.8, 220, 227; 460/16
See application file for complete search history.

(56) References Cited

U.S. PATENT DOCUMENTS

| 1,794,658 | A | * | 3/1931 | Walsh | A01D 57/10 56/1 |
| 2,670,586 | A | * | 3/1954 | Phillips | A01D 57/10 56/1 |
| 2,710,516 | A | * | 6/1955 | Kaesemeyer, Jr. | A01D 57/10 56/1 |
| 3,828,531 | A | * | 8/1974 | Quick | A01D 57/10 415/148 |
| 4,406,112 | A | * | 9/1983 | Brooks | A01D 57/10 56/12.9 |
| 4,783,951 | A | * | 11/1988 | Richards | A01D 57/10 56/12.9 |
| 4,936,082 | A | * | 6/1990 | Majkrzak | A01D 57/10 56/220 |

(Continued)

*Primary Examiner* — Robert Pezzuto
(74) *Attorney, Agent, or Firm* — Wood, Phillips, Katz, Clark & Mortimer (57) ABSTRACT

A harvesting unit with a combine, having a user cab. A harvesting apparatus, advanced by the combine, has a frame and a harvesting assembly on the frame configured to process severed crop over a width between spaced sides of the frame. A fluid delivery system discharges pressurized fluid in discrete streams each directed to at least one of: a) facilitate severance of crop by the harvesting assembly; and b) facilitate advancement of severed crop rearwardly in relationship to the frame for further processing. A user can selectively vary at least one of: a) a volume of pressurized fluid; and b) a direction of pressurized fluid in the discrete streams. A control system has at least one actuator accessible and operable from outside of the cab through a user input to cause the at least one of the volume of pressurized fluid discharged, and direction of the pressurized fluid, in the discrete streams to be varied.

20 Claims, 7 Drawing Sheets

(56) References Cited

U.S. PATENT DOCUMENTS

| | | | | |
|---|---|---|---|---|
| 5,134,837 A | * | 8/1992 | Casey | A01D 45/30 56/12.8 |
| 6,085,510 A | * | 7/2000 | McDonnell | A01D 57/10 56/12.9 |
| 7,870,713 B2 | * | 1/2011 | Schroeder | A01D 57/10 56/12.8 |

* cited by examiner

AGRICULTURAL HARVESTING UNIT AND METHOD OF HARVESTING USING THE UNIT

BACKGROUND OF THE INVENTION

Field of the Invention

This invention relates to agricultural harvesting and, more particularly, to a harvesting unit utilizing a pressurized fluid to enhance crop processing.

Background Art

For decades, crop harvesting systems have utilized pressurized fluid to assist the processing of crops. A pioneer patent in this area—U.S. Pat. No. 4,936,082 entitled "Mechanical Air Reel"—discloses a basic arrangement of components that is common to most harvesting systems with a pressurized fluid assist capability.

A harvesting "head", as commonly coupled to a combine, typically consists of a frame that bounds a processing space within which severed crop is accumulated for delivery to the combine, whereat further processing occurs. The crop is severed at the front of the frame by stationary or moving cutting bars. Laterally spaced down tubes are arranged to deliver discrete, pressurized fluid streams in the vicinity of the cutting bars. The pressurized fluid is delivered in a manner whereby it reorients the crop more optimally to be severed for placement in the frame processing space. The pressurized fluid also sweeps crop over the cutting bars that otherwise tends to submerge under the head for various reasons. At the same time, the pressurized fluid assists advancement of the severed crop towards the combine.

As this technology evolved, certain refinements were made to allow better adaptation to different crop types and conditions. Notably, these systems now commonly allow the angle of the pressurized fluid streams to be varied by a user. Further, the volume of pressurized fluid delivered in the streams is also commonly variable to both optimize the desired effect of the pressurized fluid and control horsepower draw on the combine power supply. Through appropriate adjustments, a user of the harvesting system may improve the processing capabilities for the system. Such adjustments may be necessary in crops with different stalk thickness, consistencies, dryness, etc.

With existing technology, optimal system adjustments are generally arrived at through trial and error. While experience may allow appropriate gross adjustments to be made, fine tweaking is generally carried out on trial and error basis in a field.

In one existing form, the down tubes are connected to a manifold, a part of which can be turned around a laterally extending axis to change the line of the pressurized fluid stream departing from each down tube outlet. The movement of the part of the manifold is commonly effected through a linear drive mechanism that may be powered by a typical 12 v power system for an associated combine.

To control the flow volume, it is known to incorporate a baffle into the manifold. The baffle is selectively movable to locally change the effective cross-sectional area of the manifold. In one form, the baffle pivots and is controlled in movement as by a linear drive, powered as well through the combine power system.

Heretofore, the actuators for the separate drives have been in the form of switches placed within a user cab on the combine wherein other combine functions are controlled by a user. However, seated in the cab, a user is unable to directly observe the front region of the harvesting system to determine whether a selected angle for the pressurized fluid streams and a particular flow volume is optimal. In a typical one man operation, the user will make an initial adjustment and then leave the cab to observe the pressurized, fluid flow characteristics while located at the front region of the head. He/she may then have to return to the cab to make a further adjustment, after which another inspection is carried out. This may have to be done multiple times, as a result of which valuable harvesting time may be wasted. Further, a user is inconvenienced by potentially having to repeatedly enter the cab, depart the cab to inspect, and re-enter the cab before harvesting begins.

Aside from the inconvenience, a user has an increased likelihood of injury by reason of having to repeatedly enter and exit the cab by climbing over different structure on the head and combine below the elevated cab.

Alternatively, the initial setup may be carried out by multiple individuals, with one occupying the cab and controlling the actuators, and the other situated to observe the front of the system and relay recommendations regarding adjustments to the user in the cab. This is generally inconvenient and doubles necessary manpower at startup.

Further, crop conditions may vary in a single field or in multiple fields during a typical harvesting day. Thus, adjustments may have to be made periodically, as a result of which the user experiences the same inconvenience and loss of time and/or may inefficiently use manpower as discussed above.

The industry has continued to contend with the above problems because of a lack of any practical solution therefor.

SUMMARY OF THE INVENTION

In one form, the invention is directed to a harvesting unit with a combine configured to be advanced over underlying terrain and process severed crop delivered to the combine. The combine has a cab from which a user can control operation of the combine. A harvesting apparatus is configured to be advanced by the combine over an area in which crop is grown. The harvesting apparatus has a frame with laterally spaced sides, a front and a rear. The harvesting apparatus has a harvesting assembly on the frame configured to process severed crop over a width between the spaced sides of the frame as the frame is advanced by the combine. A fluid delivery system is provided through which pressurized fluid is discharged in discrete streams each directed to at least one of: a) facilitate severance of crop by the harvesting assembly; and b) facilitate advancement of severed crop rearwardly in relationship to the frame for further processing. The fluid delivery system is configured so that a user can selectively vary at least one of: a) a volume of pressurized fluid discharged in the discrete streams; and b) a direction of the pressurized fluid in the discrete streams. The fluid delivery system has a control system with at least one actuator accessible and operable from outside of the cab through a user input to cause the at least one of the volume of pressurized fluid discharged, and direction of the pressurized fluid, in the discrete streams to be varied.

In one form, the fluid delivery system has a plurality of tubes with outlets from which the discrete streams project. The at least one actuator is located to allow a user to access and provide an input to the at least one actuator from a location that allows the user to directly observe the tube outlets.

In one form, the at least one actuator is configured to allow a user to access and provide an input to the at least one actuator with the user located in front of the harvesting apparatus.

In one form, the fluid delivery system has a pressurized fluid source, a plurality of tubes with outlets from which the discrete streams project, and a manifold assembly that directs pressurized fluid from the pressurized fluid source to the plurality of tubes. At least a part of the manifold assembly is configured to turn around a laterally extending axis relative to the frame to thereby vary the direction of the pressurized fluid in the discrete streams.

In one form, the fluid delivery system has at least one baffle that is movable relative to a part of the manifold assembly to thereby vary the volume of fluid delivered from the pressurized fluid source to the plurality of tubes.

In one form, the control system has a drive and a controller. The drive is operated in response to a signal from the controller resulting from a user input to the at least one actuator to thereby cause the at least one of the volume of pressurized fluid discharged, and direction of the components of the pressurized fluid, in the discrete streams to be varied.

In one form, the control system has an actuator accessible and operable by a user input from within the cab to cause the at least one of the volume of pressurized fluid discharged, and direction of the pressurized fluid, in the discrete streams to be varied.

In one form, the at least one actuator and controller are configured so that the user input causes a signal to be communicated wirelessly to the controller to thereby cause the drive to be operated through the controller.

In one form, the combine has a power system. The controller is powered by the combine power system.

In one form, the drive has a linear drive assembly.

In one form, the control system has first and second drives, a controller, and a second actuator. The first drive is operated in response to a signal from the controller resulting from a user input to the one actuator to thereby cause the first drive to move the one baffle relative to the part of the manifold assembly. The second drive is operated in response to a signal from the controller resulting from a user input to the second actuator to thereby cause the second drive to turn the part of the manifold assembly around the laterally extending axis.

In one form, the controller and one and second actuators are configured so that the user input to each of the one and second actuators causes a signal to be communicated wirelessly to the controller to thereby cause the first and second drives to be operated through the controller.

In one form, the control system has a hand-holdable control box on which the one and second actuators are provided. The control box is untethered to a remainder of the harvesting unit whereby a user can effect operation of the one and second drives through the control box within a range around the remainder of the harvesting unit.

In one form, the controller and one and second actuators are configured to communicate with each other using RF signals.

In one form, the control system has an RF receiver within the cab.

In one form, the control system is configured so that the drive is caused to be operated by a signal sent by a wired connection between the controller and drive.

In one form, the control system is configured so that the drive is caused to be operated by a signal sent wirelessly from the controller to the drive.

In one form, the invention is directed to a method of harvesting crop including the steps of: obtaining the harvesting unit described above; while at a location outside of the cab and adjacent to a front region of the harvesting apparatus, providing an input to the at least one actuator to thereby cause the at least one of the volume of pressurized fluid discharged, and direction of the pressurized fluid, in the discrete streams to be varied; and advancing the harvesting unit through a field to harvest growing crop after providing the input to the at least one actuator.

In one form, the step of providing an input to the at least one actuator includes the steps of separately providing inputs to the one and a second actuator to cause both the volume of pressurized fluid discharged, and direction of the pressurized fluid, in the discrete streams to be varied.

In one form, the one and second actuators are on a control box that is untethered to a remainder of the harvesting unit. The step of operating the one and second actuators involves operating the one and second actuators from a location that is spaced from the remainder of the harvesting unit.

DETAILED DESCRIPTION OF THE PREFERRED EMBODIMENT

Figure 1:
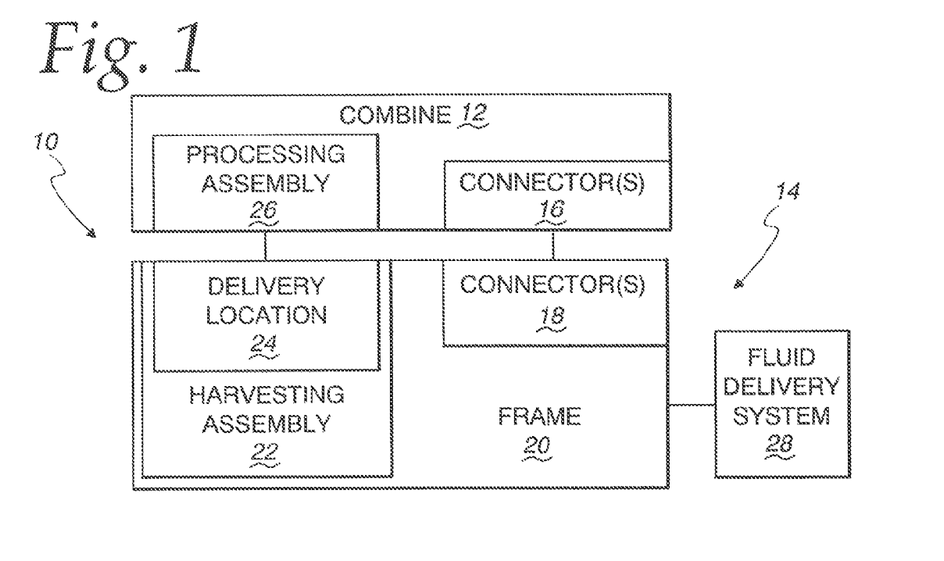
FIG. 1 is a schematic representation of a harvesting unit, according to the present invention.

A harvesting unit, according to the invention, is shown schematically at 10 in FIG. 1. The harvesting unit 10 is made up of a combine 12, configured to be advanced over underlying terrain, and a harvesting apparatus at 14, configured to be advanced by the combine 12 over an area in which crop is grown. The harvesting apparatus 14 is commonly referred to as a "head" that may be releasably joined to the combine 12 through cooperating connectors 16, 18, respectively on the combine 12 and harvesting apparatus 14.

The harvesting apparatus 14 has a frame 20 that supports operating components for the harvesting apparatus 14. The frame 20 has laterally spaced sides, a front, and a rear.

A harvesting assembly 22 on the frame 20 is configured to process crop over a width between spaced sides of the frame 20 as it is advanced. The harvesting assembly 22 may be configured to: a) sever crop; and/or b) process pre-severed crop, as by controlled delivery to the combine 12.

The harvesting assembly 22 may include virtually a limitless number of different constructions. In just one exemplary form, the harvesting assembly 22 may include a reel that rotates around a laterally extending axis relative to the frame 20 to direct crop rearwardly relative to the frame 20 towards the combine 12.

The harvesting assembly 22 may include an auger that causes crop intercepted and contained on the frame 20 to be routed from laterally opposite sides in paths converging at a delivery location 24. Alternatively, it may use a drape or a design with a fabric or rubber apron that performs the function of the cross auger.

Whether the harvesting assembly 22 is designed to sever crop or handle only pre-severed crop, generally it will be configured to accommodate/process the severed crop over the width thereof and cause the severed crop to be directed to the delivery location 24, from where the crop is directed to a processing assembly 26 on the combine 12 through which usable crop is separated and accumulated either in the combine 12, or at a separate point of use, such as in a separate storage device.

The harvesting unit 10 further includes a fluid delivery system at 28. The fluid delivery system 28 may be an integral part of the frame 20 or a separate assembly.

Figure 2:
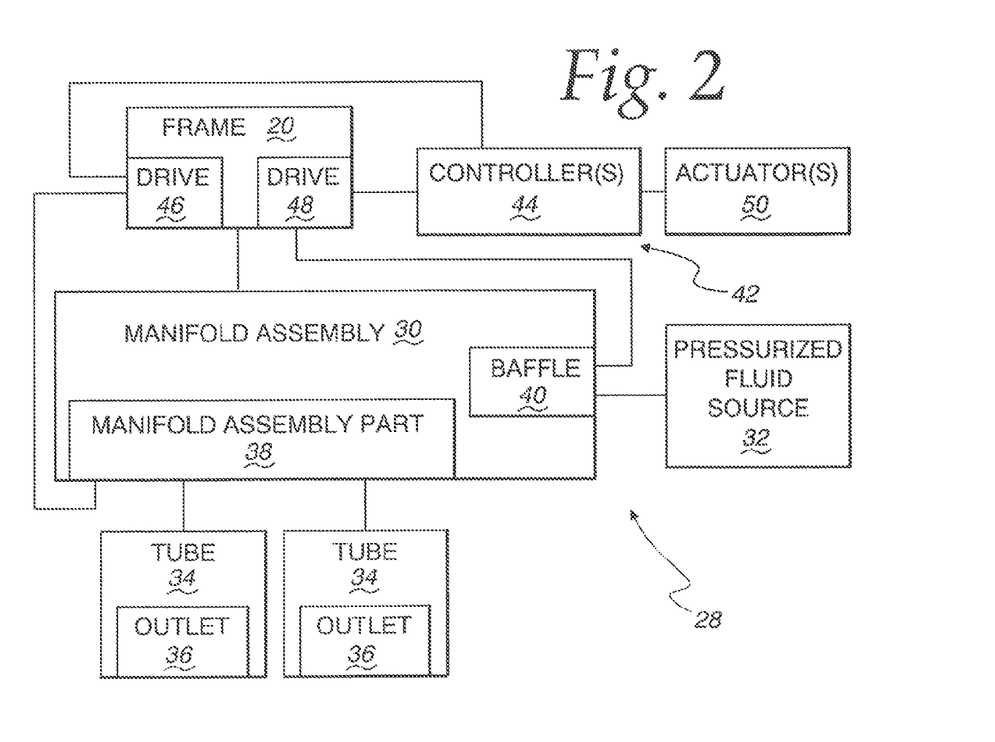
FIG. 2 is a schematic representation showing additional details of the harvesting unit in FIG. 1, including details of a fluid delivery system thereon.

Additional details of the fluid delivery system 28 are shown schematically in FIG. 2. The fluid delivery system 28 has a manifold assembly 30 that delivers a fluid under pressure from a source 32 to a plurality of tubes/down tubes 34. Each tube 34 causes the pressurized fluid to be controllably discharged in a stream at an outlet 36 associated with each tube 34.

A part 38 of the manifold assembly 30 supporting the tubes 34 is repositionable relative to the frame 20 to reorient the tubes 34 to thereby change the direction of the fluid streams discharging from the tube outlets 36.

A baffle 40 is movable relative to part of the manifold assembly 30 to thereby vary a volume of pressurized fluid delivered from the pressurized fluid source 32 to the tubes 34.

The pressurized fluid streams are designed to facilitate severance of crop and/or facilitate advancement of severed crop rearwardly in relationship to the frame 20 for further processing.

The fluid delivery system 28 further includes a control system at 42. The control system 42 is made up of at least one controller 44 through which frame mounted drives 46, 48 are operated. The drive 46 is responsible for moving the manifold part 38, with the drive 48 responsible for moving the baffle 40. The drives 46, 48 are caused to be operated through an input by a user to one or more actuators 50. Through the control system 42, the user can effect operation of one or both of the drives 46, 48 to thereby vary one or both of: a) the volume of pressurized fluid discharged through the tubes 34; and b) the direction of the pressurized fluid streams discharged at the tube outlets 36.

The schematic showing in FIGS. 1 and 2 is intended to generally describe the components making up the inventive harvesting unit 10. The components disclosed therein may take a number of different forms and may interact in different manners. The schematic showing is intended to encompass the specific forms shown hereinbelow as well as a multitude of variations of each of the components and their interaction as would be obvious to one skilled in the art with the present teachings in hand.

As but one example, the schematic showing in FIGS. 1 and 2 encompasses harvesting units as shown in U.S. Pat. No. 4,936,082 and Applicant's pending application Ser. No. 14/686,039, entitled "Harvesting Apparatus Utilizing Pressurized Fluid." The disclosure in U.S. Pat. No. 4,936,082 and that in application Ser. No. 14/686,039 are incorporated in their entirety by reference herein. It is unnecessary to discuss in detail basic operation of components in the harvesting unit 10 and focus herein will be on those most significant with respect to the inventive concepts.

As seen in FIGS. 3-9, the combine 12 has a cab 52 within which a user 54 can be seated in a climate controlled environment and control most combine functions. The user 54 is at a location that he/she observes the particular field from a location a significant distance behind the harvesting apparatus 14. Thus, the user 54, seated in the cab 52, cannot directly see the discharging pressurized fluid interacting with crop 56 that would allow the user 54 to make an appropriate adjustment of the pressurized fluid volume exiting the tubes 34 and/or the direction of the discharging fluid streams therefrom.

Figure 5:
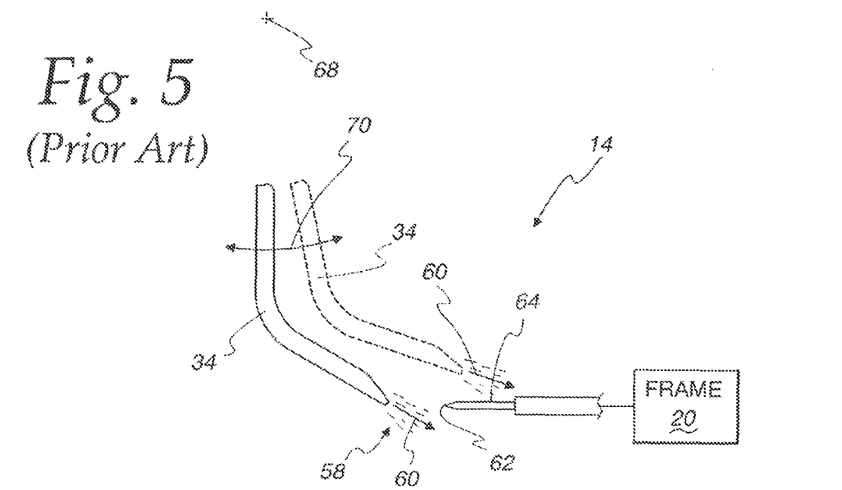
FIG. 5 is an enlarged, fragmentary, side elevation view showing impingement of pressurized fluid streams relative to a cutting bar on the harvesting apparatus in FIG. 4 and with an exemplary down tube in two different positions.
Figure 6:
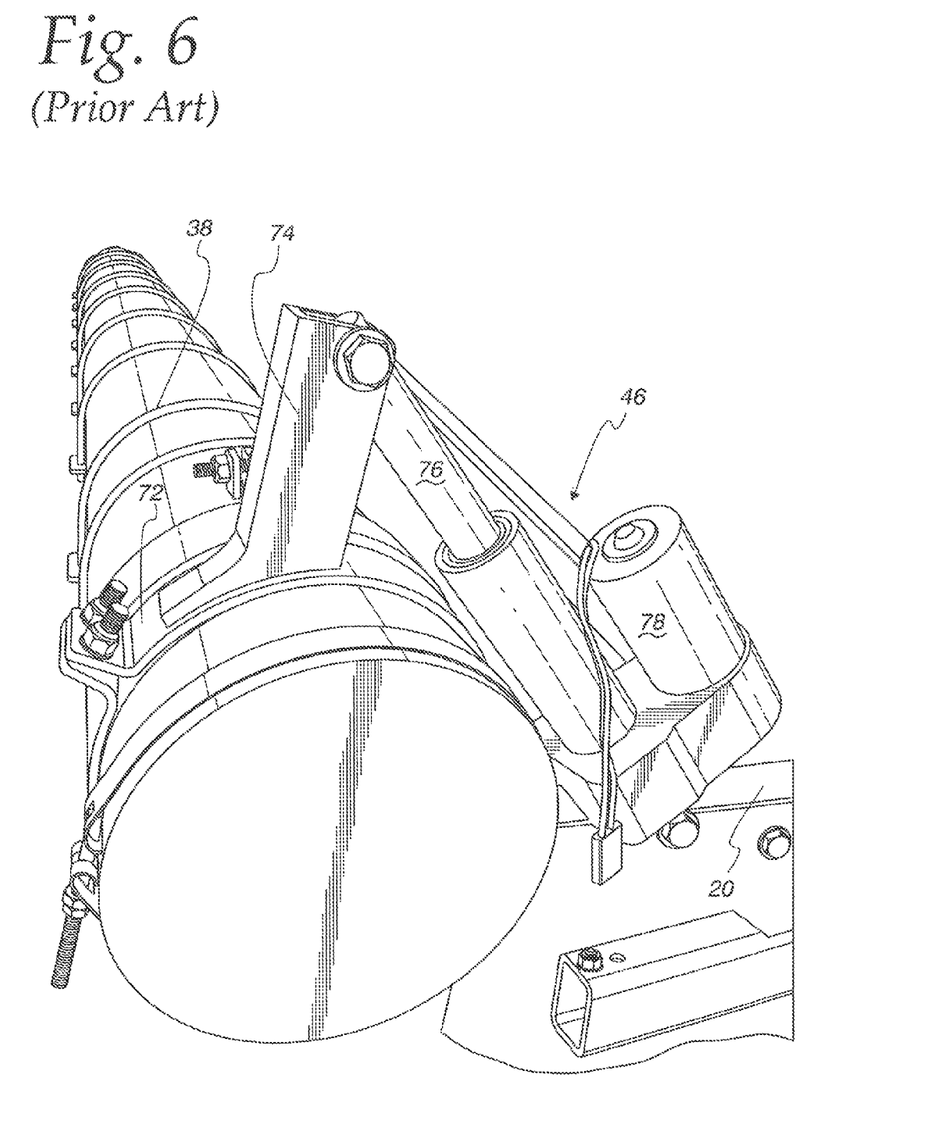
FIG. 6 is a fragmentary, perspective view of the manifold assembly in FIG. 4 and showing a drive for moving a part of the manifold assembly at one end thereof.

More specifically, as seen with the known structure in FIG. 5, the primary volume of the fluid stream at 58 is discharged from each tube 34 in a direction indicated by the arrow 60. Each stream 58 is directed generally downwardly and rearwardly to interact with crop in the vicinity of a leading edge 62 on a cutting bar 64 on the frame 20 of the harvesting apparatus 14. By changing the stream direction, the crop is repositioned in different manners preparatory to cutting to thereby facilitate severance of the crop. This flow tends to sweep crop tending to submerge under the cutting bar 64 to a position wherein it will be intercepted by the cutting edge 62. The streams 58 also advance severed crop rearwardly relative to the frame 20 within its lateral dimension.

Of course, the nature of the cutting structure for the crop is not critical to the invention, as numerous different structures are currently used. For example, the cutting bar 64 may be a fixed component. Alternatively, the cutting bar 64 may be made up of multiple movable parts to effect crop severance.

Figure 4:
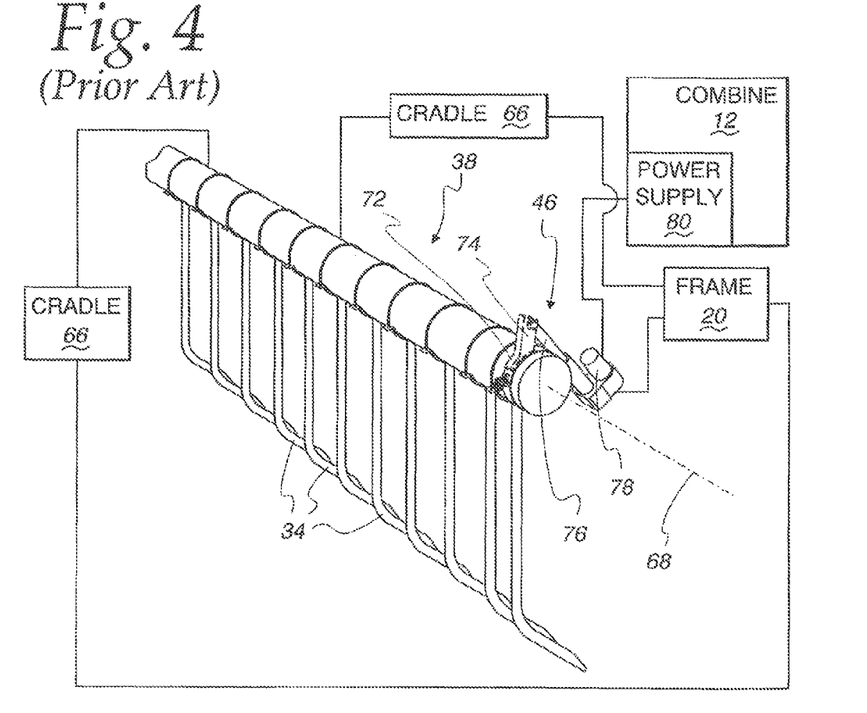
FIG. 4 is a fragmentary, partially schematic representation of an existing manifold assembly with laterally spaced and repositionable down tubes for directing pressurized fluid against crop during a harvesting operation.

As shown for the exemplary known construction in FIG. 4, the manifold assembly part 38, which moves as one piece with the down tubes 34, is supported on the frame 20 through laterally spaced cradles 66. The cradles 66 are configured so that the manifold assembly part 38 is guided in pivoting movement around a horizontally extending axis 68 relative to the frame 20. As this occurs, the tubes 34, which move as one piece with the manifold assembly part 38, pivot back and forth around the axis 68 in a path, as indicated by the double-headed arrow 70 in FIG. 5, to thereby change the direction of the streams 58 relative to the frame 20 and cutting bar 64.

The drive 46 connects between the frame 20 and a surrounding sleeve 72 that embraces the outer surface of the manifold assembly part 38. The sleeve 72 has a projecting operating arm 74 that connects through a pivot arrangement to the drive 46. In this case, the drive is a linear drive component with an extendable rod 76 repositionable through a motor 78 powered by a conventional 12V power supply 80 on the combine 12. Extension and retraction of the rod 76 causes the manifold assembly part 38 to pivot in opposite directions around the axis 68.

Figure 7:
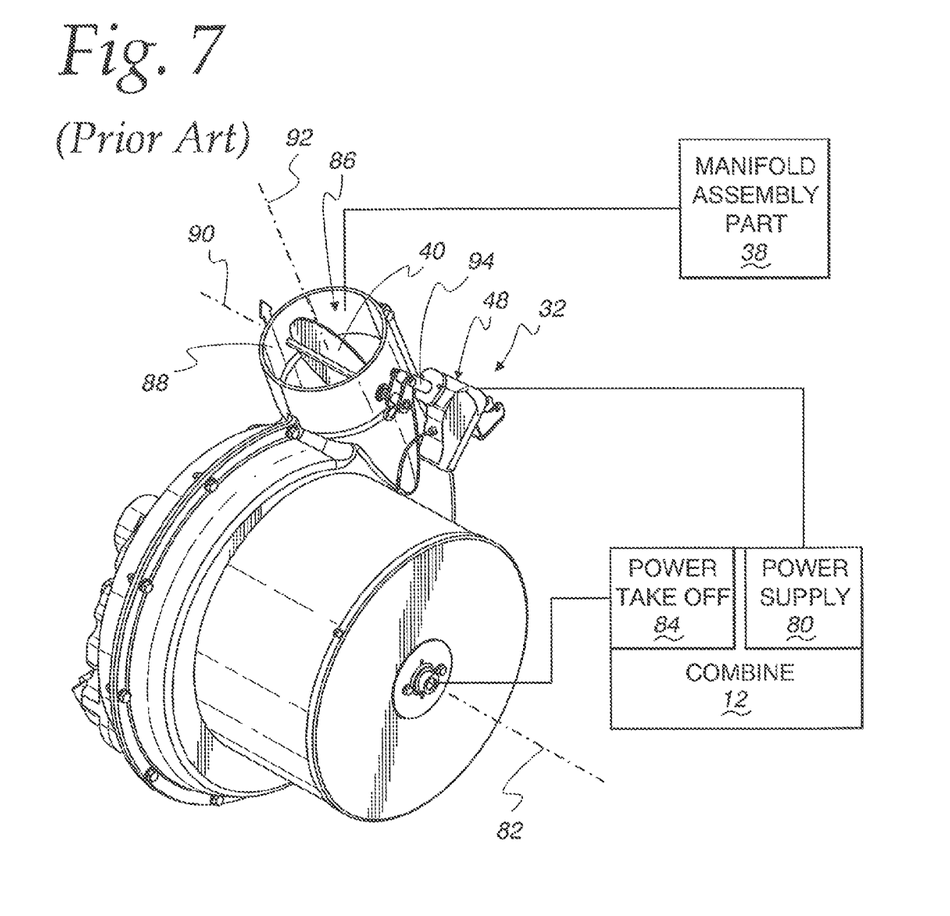
FIG. 7 is a partially schematic, perspective view of an existing source for supplying pressurized fluid to the manifold assembly as shown in FIGS. 4 and 6.

An exemplary form of the pressurized fluid source at 32 is shown in FIG. 7. The fluid source 32 depicted is an existing construction that uses a centrifugal fan component (not shown) rotated around an axis 82 by a power takeoff 84 on the combine 12.

The fluid source 32 has an outlet 86 defined by a sleeve 88 that is connected to communicate generated pressurized fluid directly or indirectly to the manifold assembly part 38.

Within the sleeve 88, the baffle 40 is mounted for pivoting movement around an axis 90. The baffle 40 is in the form of a flat plate having a central plane. The plate is turned around the axis 90 between positions wherein the plane of the plate blocks the sleeve 88 and a position wherein the plane is generally parallel to the sleeve axis 92. By selecting the desired baffle position, the volume of pressurized fluid delivered to the manifold assembly part 38 can be controlled within a range.

The drive 48 may be a linear drive, similar in construction to the aforementioned drive 46 associated with the manifold assembly part 38. The drive 48 is powered through the combine power supply 80. Operation of the drive 48 effects extension and retraction of a rod 94 that effects opposite turning movement of the baffle 30 to around the axis 90.

Figure 8:
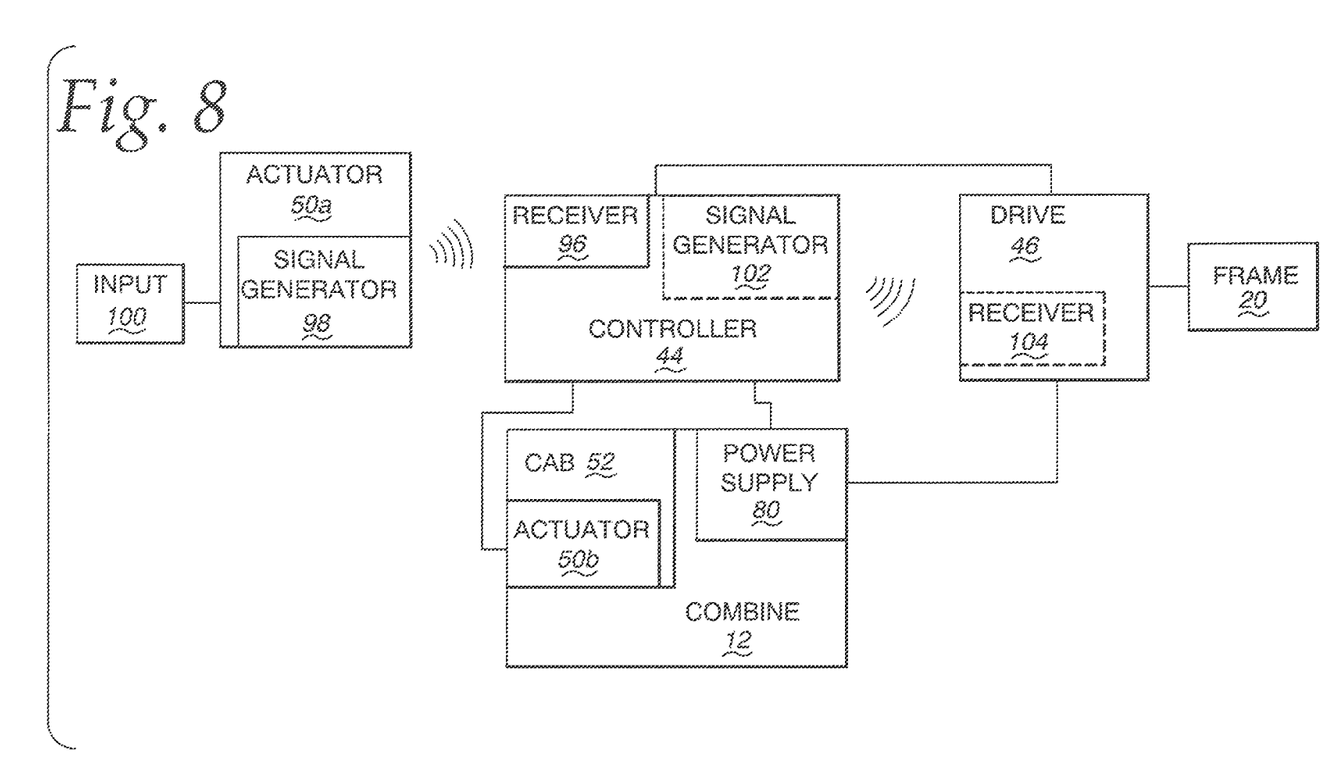
FIG. 8 is a schematic representation of a control system, according to the invention, for varying volume and direction of fluid streams discharged through down tubes.

In FIG. 8, one exemplary control arrangement is depicted for the exemplary drive 46 for the manifold assembly part 38. As depicted, the controller 44 and drive 46 are powered through the power supply 80 on the combine 12. The controller 44 has a receiver 96 for a wireless signal produced by a generator 98 that is part of the actuator 50*a*. The receiver might be within the combine cab 52. The actuator 50*a* is caused to generate the signal to the receiver 96 when receiving an input at 100 from a user. Any wireless transmission is contemplated, such as a system using radio frequency (RF) transmission.

The controller 44 may be hardwired to the drive 46. Alternatively, the controller 44 may incorporate a generator 102 for sending a wireless signal to a receiver 104 on the drive 46 to effect operation thereof.

As shown in FIG. 8, a hardwired actuator 50*b* may be provided in the combine cab 52 to have a function redundant to that of the actuator 50*a*.

Figure 3:
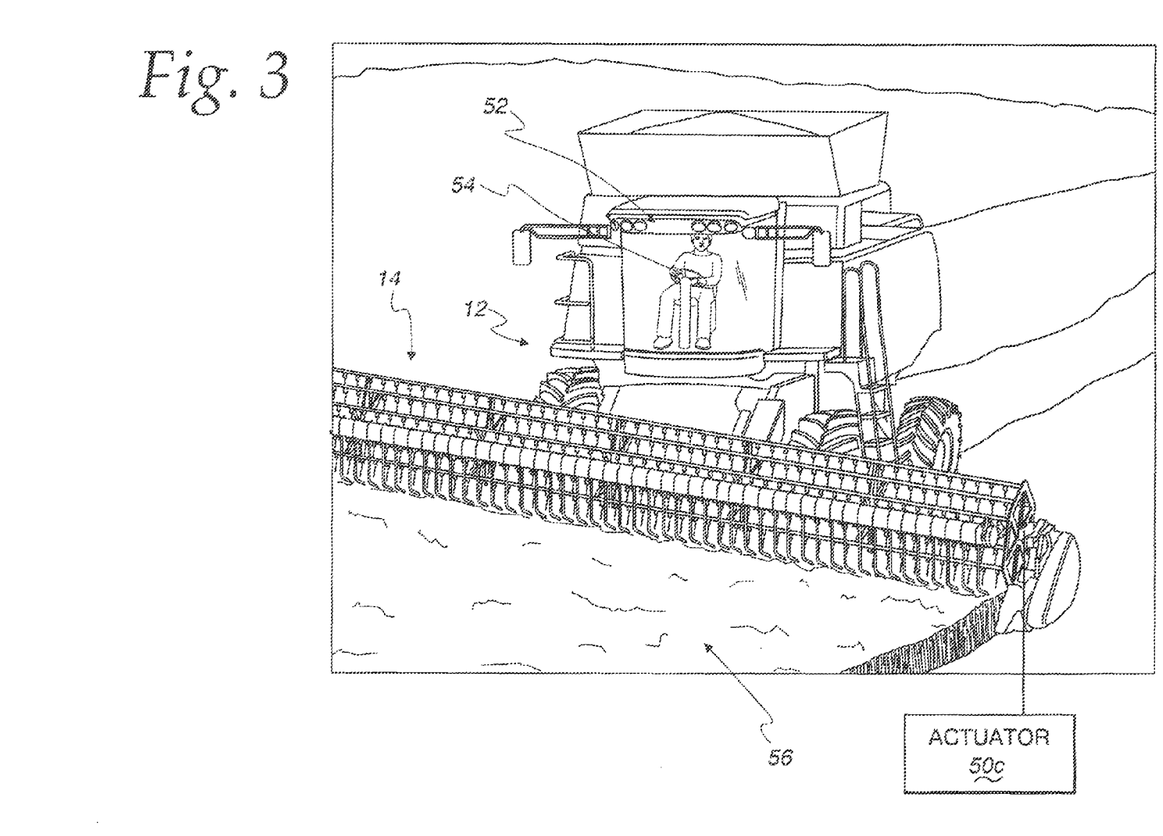
FIG. 3 is a perspective view of one specific form of harvesting unit, according to the invention.

As a still further alternative, an actuator 50*c* may be provided to be accessible from at the front region of the harvesting apparatus 14, as shown in FIG. 3. A user may be able to provide an input to the actuator 50*c* at this location while directly observing the front of the harvesting apparatus 14.

Figure 9:
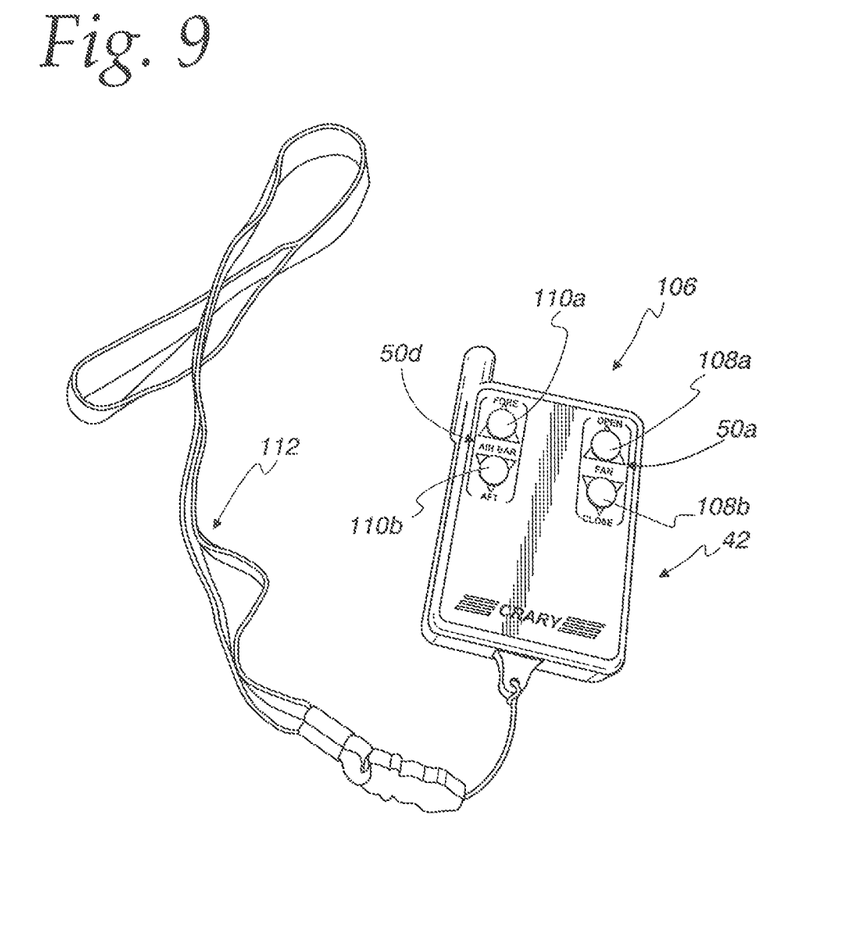
FIG. 9 is a perspective view of a control box, according to the invention, incorporating actuators to which inputs can be made by a user to selectively vary volume and direction of discharge streams of pressurized fluid.

In one exemplary form, as shown in FIG. 9, the actuator 50*a* for the drive 46, and a like functioning actuator 50*d* for the drive 48, are integrated into a control box at 106 that makes up part of the control system 42. By incorporating wireless transmission capabilities, the control box 106 may remain untethered to the remainder of the harvesting unit 10, whereby a user can effect operation of the drives 46, 48 through the control box 106 within a controlled range around a remainder of the harvesting unit 10.

The actuators 50*a*, 50*b*, 50*c*, 50*d* may be configured to respond to any type of conventional user input, such as turning of a dial, repositioning of a switch, pushing a button, engaging a touch pad, etc. In the depicted form in FIG. 9, each actuator 50*a*, 50*d* has a pair of input push pads 108*a*, 108*b*; 110*a*, 110*b*. Indicia are provided to allow a user to visually identify the appropriate location to press to effect the desired operation. As depicted, the actuator 50*a* allows the volume to be varied by pressing the "open" pad 108*a* to increase volume, and "close" pad 108*b* to decrease volume of the pressurized fluid.

On the actuator 50*d*, pressing the pads 110*a*, 110*b* respectively shifts the outlets 36 forwardly and rearwardly by reason of the tubes following the pivoting movement of the manifold assembly part 38 around its axis 68. This pivoting also changes the discharge direction of the discharging fluid streams 58.

A strap 112 is provided on the control box 106 to facilitate handling and storage thereof, as by placing the strap around one of the user's limbs.

There are many variations of the invention, as described above. In one form, a user has the option of controlling the volume and direction of fluid in the streams 58 without leaving the cab 52. Alternatively, the user can vary the volume and direction of the streams 58 from locations anywhere around the remainder of the harvesting unit 10 as long as he/she remains within the range of wireless signal generation. As a further alternative, the user might use a non-wireless construction to input at the front region of the harvesting apparatus 14 so as to cause fluid flow adjustment.

Figure 10:
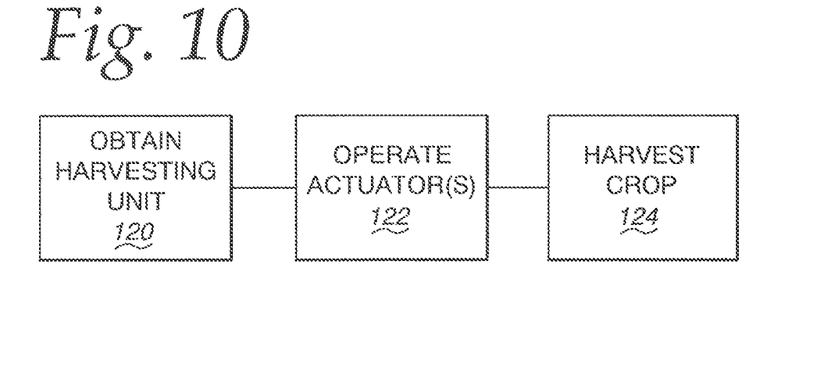
FIG. 10 is a flow diagram representation of a method of harvesting crop, according to the invention.

With the harvesting unit as described above, the user can carry out a method of harvesting crop, as shown schematically in FIG. 10.

As shown at block 120, the user obtains a desired configuration of harvesting unit, as described above.

As shown at block 122, with the user at a location outside of the cab and adjacent to a front region of the harvesting apparatus, he/she operates at least one actuator to thereby cause at least one of the volume of pressurized fluid, and direction of the pressurized fluid, in discrete discharging streams to be varied.

As shown at block 124, the harvesting unit, with the pressurized fluid controlled to a selected volume and output stream direction, is advanced through a field to harvest grown crop.

The method may involve operating one or more actuators to effect the desired system adjustments.

The actuators may be on a control box or otherwise supported to facilitate ease of operation.

The foregoing disclosure of specific embodiments is intended to be illustrative of the broad concepts comprehended by the invention.

The invention claimed is:

1. A harvesting unit comprising:
   a combine configured to be advanced over underlying terrain and process severed crop delivered to the combine,
   the combine having a cab from which a user can control operation of the combine;
   a harvesting apparatus configured to be advanced by the combine over an area in which crop is grown,
   the harvesting apparatus having a frame with laterally spaced sides, a front and a rear,
   the harvesting apparatus comprising a harvesting assembly on the frame configured to process severed crop over a width between the spaced sides of the frame as the frame is advanced by the combine; and
   a fluid delivery system through which pressurized fluid is discharged in discrete streams each directed to at least one of: a) facilitate severance of crop by the harvesting assembly; and b) facilitate advancement of severed crop rearwardly in relationship to the frame for further processing,
   the fluid delivery system configured so that a user can selectively vary at least one of: a) a volume of pressurized fluid discharged in the discrete streams; and b) a direction of the pressurized fluid in the discrete streams,
   the fluid delivery system comprising an electronic control system comprising at least one actuator accessible and operable from outside of the cab through a user input to cause the at least one of the volume of pressurized fluid discharged, and direction of the pressurized fluid, in the discrete streams to be varied.

2. The harvesting unit according to claim 1 wherein the fluid delivery system comprises a plurality of tubes with outlets from which the discrete streams project and the at least one actuator is located to allow a user to access and provide an input to the at least one actuator from a location that allows the user to directly observe the tube outlets.

3. The harvesting unit according to claim 1 wherein the at least one actuator is configured to allow a user to access and provide an input to the at least one actuator with the user located in front of the harvesting apparatus.

4. The harvesting unit according to claim 1 wherein the fluid delivery system comprises a pressurized fluid source, a plurality of tubes with outlets from which the discrete streams project, and a manifold assembly that directs pressurized fluid from the pressurized fluid source to the plurality of tubes, at least a part of the manifold assembly configured to turn around a laterally extending axis relative to the frame to thereby vary the direction of the pressurized fluid in the discrete streams.

5. The harvesting unit according to claim 4 wherein the fluid delivery system comprises at least one baffle that is movable relative to a part of the manifold assembly to thereby vary a volume of fluid delivered from the pressurized fluid source to the plurality of tubes.

6. The harvesting unit according to claim 5 wherein the control system comprises a drive and a controller, the drive operated in response to a signal from the controller resulting from a user input to the at least one actuator to thereby cause the at least one of the volume of pressurized fluid discharged, and direction of the components of the pressurized fluid, in the discrete streams to be varied.

7. The harvesting unit according to claim 1 wherein the control system comprises an actuator accessible and operable by a user input from within the cab to cause the at least one of the volume of pressurized fluid discharged, and direction of the pressurized fluid, in the discrete streams to be varied.

8. The harvesting unit according to claim 6 wherein the at least one actuator and controller are configured so that the user input causes a signal to be communicated wirelessly to the controller to thereby cause the drive to be operated through the controller.

9. The harvesting unit according to claim 8 wherein the combine has a power system and the controller is powered by the combine power system.

10. The harvesting unit according to claim 6 wherein the drive comprises a linear drive assembly.

11. The harvesting unit according to claim 5 wherein the control system comprises first and second drives, a controller, and a second actuator, the first drive operated in response to a signal from the controller resulting from a user input to the one actuator to thereby cause the first drive to move the one baffle relative to the part of the manifold assembly, the second drive operated in response to a signal from the controller resulting from a user input to the second actuator to thereby cause the second drive to turn the part of the manifold assembly around the laterally extending axis.

12. The harvesting unit according to claim 11 wherein the controller and one and second actuators are configured so that the user input to each of the one and second actuators causes a signal to be communicated wirelessly to the controller to thereby cause the first and second drives to be operated through the controller.

13. The harvesting unit according to claim 12 wherein the control system comprises a hand-holdable control box on which the one and second actuators are provided and which is untethered to a remainder of the harvesting unit whereby a user can effect operation of the one and second drives through the control box within a range around the remainder of the harvesting unit.

14. The harvesting unit according to claim 12 wherein the controller and one and second actuators are configured to communicate with each other using RF signals.

15. The harvesting unit according to claim 14 wherein the control system comprises an RF receiver within the cab.

16. The harvesting unit according to claim 8 wherein the control system is configured so that the drive is caused to be operated by a signal sent by a wired connection between the controller and drive.

17. The harvesting unit according to claim 8 wherein the control system is configured so that the drive is caused to be operated by a signal sent wirelessly from the controller to the drive.

18. A method of harvesting crop comprising the steps of:
obtaining the harvesting unit recited in claim 1;
while at a location outside of the cab and adjacent to a front region of the harvesting apparatus, providing an input to the at least one actuator to thereby cause the at least one of the volume of pressurized fluid discharged, and direction of the pressurized fluid, in the discrete streams to be varied; and
advancing the harvesting unit through a field to harvest growing crop after providing the input to the at least one actuator.

19. The method of harvesting crop according to claim 18 wherein the step of providing an input to the at least one actuator comprises the steps of separately providing inputs to the one and a second actuator to cause both the volume of pressurized fluid discharged, and direction of the pressurized fluid, in the discrete streams to be varied.

20. The method of harvesting crop according to claim 19 wherein the one and second actuators are on a control box that is untethered to a remainder of the harvesting unit and the step of operating the one and second actuators comprises operating the one and second actuators from a location that is spaced from the remainder of the harvesting unit.

* * * * *